United States Patent [19]

Zimmermann et al.

[11] Patent Number: 6,106,953
[45] Date of Patent: Aug. 22, 2000

[54] USING A CLEANING CLOTH IMPREGNATED WITH COUPLING AGENT FOR ADHESIVE FILMS

[75] Inventors: Dieter Zimmermann, Jork; Bernd Lühmann, Norderstedt; Klaus Wachtmann, Beckum, all of Germany

[73] Assignee: Beiersdorf AG, Hamburg, Germany

[21] Appl. No.: 09/072,253

[22] Filed: May 4, 1998

[30] Foreign Application Priority Data

May 16, 1997 [DE] Germany .............................. 197 20 526
Mar. 25, 1998 [DE] Germany .............................. 198 13 081

[51] Int. Cl.⁷ ...................................................... B32B 11/04
[52] U.S. Cl. .......................... 428/440; 428/429; 428/492; 428/688
[58] Field of Search ...................................... 428/429, 440, 428/492, 688

[56] References Cited

U.S. PATENT DOCUMENTS

| 4,157,321 | 6/1979 | Kawakami et al. ............. 260/29.1 SB |
| 5,220,047 | 6/1993 | Pohl et al. ............................... 556/420 |
| 5,789,080 | 8/1998 | Grimberg et al. . |

FOREIGN PATENT DOCUMENTS

| 577014 | 1/1994 | European Pat. Off. . |
| 2732364 | 10/1998 | France . |

OTHER PUBLICATIONS

Derwent Publications Ltd., Week 8340, Class A81, AN 83–780690 XP002074748 & JP 58 145 776 (Nitto Electric Ind. Co.).

Patent Abstracts of Japan, vol. 096, No. 010, Oct. 31, 1996, & JP 08 165458 A (Kansai Paint Co. Ltd), Jun. 25, 1996.

*Primary Examiner*—Helen L. Pezzuto
*Attorney, Agent, or Firm*—Norris, McLaughlin & Marcus, P.A.

[57] ABSTRACT

Use of a prior-cleaning cloth for an adhesive bond brought about by means of an adhesive film which is rereleasable without damage by pulling in the direction of the bond plane and which has an adhesive composition based on polymers and/or copolymers of synthetic rubber and/or natural rubber, characterized in that the substrate to be bonded is rubbed with a prior-cleaning cloth of this kind which is impregnated with a moisture-reactive organosilane, the organosilane being dissolved in a solvent or solvent mixture and being present therein in a concentration of 0.1–3% by weight, whereupon, following a waiting time of a few minutes, the adhesive film is pressed onto the treated area and then an article, hook or the like is bonded to the other side of the adhesive film, or else in that, after a waiting time of a few minutes, the adhesive film is pressed onto the treated area, an article, hook or the like already being located in bonded-on form on the reverse of the adhesive film.

14 Claims, No Drawings

USING A CLEANING CLOTH IMPREGNATED WITH COUPLING AGENT FOR ADHESIVE FILMS

The invention relates to the use of a cloth for prior cleaning, impregnated with a coupling agent which improves the bond strength, in particular, in the wet-cell region between a glass or ceramic surface and an adhesive film.

PRIOR ART

Highly elastic adhesive films (the term adhesive film is used synonymously in the text below) for rereleasable bonds which can be released again by pulling in the direction of the bond plane are known. They are obtainable commercially under the designations "tesa Power-Strips"® and "tesa Poster-Strips" and "tesa Power-Strips System-Haken"®, a so-called system hook with base plate and attachable decorative hook, from Beiersdorf AG. Bonds produced therewith offer a powerful hold and yet can be released again without trace and without damage to the substrate and to the adherends, as is described in DE 33 31 016 C2.

DE 37 14 453 describes a practice explosive charge which can be removed again nondestructively from practice objects and which is fastened reversibly using an adhesive film of this type.

DE 42 22 849 describes a strip of adhesive film with a specially designed tab, especially a UV-impermeable tab.

DE 42 33 872 and U.S. Pat. No. 5,507,464 describe rereleasable self-adhesive hooks which have been provided with adhesive films.

Furthermore, DE 195 11 288 describes the use of such adhesive films for a base plate to which further articles can be engageably attached, with the visually disruptive tab in particular being covered.

In conclusion, U.S. Pat. No. 4,024,312 describes highly stretchable adhesive films composed of a highly elastic and extensible backing based on styrene block copolymers, and a pressure-sensitive adhesive composition. The pressure-sensitive adhesive composition consists either of polyisoprene (e.g. natural rubber) or of synthetic rubbers based on styrene block copolymers in a blend with tackifier resins and, if desired, with further blend components, as are also employed for the backing material. These adhesive tapes can readily be removed from the substrate by stretching parallel to the bond surface and are particularly suitable for applications in the medical sector, where pain-free removal from the skin is desired.

WO 92/11333 describes an adhesive tape which is rereleasable by pulling in the bond plane and which employs as its backing a highly stretchable, essentially non-resiling (non-elastomeric) film which after stretching has <50% resilience.

WO 92/11332 describes an adhesive tape which is rereleasable by pulling in the bond plane and for which it is possible to use as its backing either a stretch-able, highly elastic (elastomeric) film or a highly stretchable, essentially non-resiling film. Adhesive compositions employed are exclusively UV-crosslinked acrylate copolymers.

WO 95/06691 describes adhesive tapes which can be rereleased by pulling in the bond plane and which as their backing utilize a foamed, non-pressure-sensitive adhesive film support.

Adhesive films of the abovementioned type thus permit a good adhesive assembly and, subsequently, release by extension of the elastically or plastically stretchable film.

Nevertheless, even these systems have weaknesses. For instance, the adhesive joint is required to withstand not only exposure to various forces but also exposure to temperature and humidity without suffering damage. Exacting demands are placed on the implementation of the bond and on the adhesive film in connection with the bonding of adhesive films, especially in the wet cell region.

One possibility of enhancing the bond strength of such adhesive assemblies is described in DE 19537323. Bond strength reduction caused by air inclusions is avoided by a corresponding fastening device having duct-like depressions through which the included air is able to escape.

Another option for improving the bond strength is the use of coupling agents. The quality of the adhesive bond depends, indeed, on the nature of the substrate and on its surface preparation, on the cohesive behaviour of the adhesive and on the adhesive interactions of the adhesive with the surface that is to be bonded. In order to improve adhesion between the substrate and adhesive film, the former can be pre-treated with coupling agents (adhesion promoters). These react both with the adherend surface and with the adhesive film, and therefore act as chemical bridges. They are capable of improving the strength of bonds, and especially of improving their ageing behaviour in a humid atmosphere and even on contact with water.

In the field of adhesive bonding, a major representative of the coupling agents embraces the group of organosilicon compounds (silanes) of the general formula $(RO)_3$—Si—$(CH_2)_n$—X. Customary substituents RO include methoxy and ethoxy groups; depending on the adhesive composition the reactive end group X can be, for example, an amino ($NH_2$), hydroxyl (OH), vinyl ($CH_2$=CH—), methacrylic ($CH_2$=C—$CH_3$) or an epoxy group. Owing to the dual functionality of the coupling agent, the RO substituent reacts with the adherend surface. With traces of water, the coupling agent hydrolyses to form highly unstable intermediate bonds, undergoes partial polymerization to form polysilanes, and/or, by way of the remaining HO—Si groups, undergoes condensation with the OH groups of an inorganic material (for example, glass or ceramic materials).

Hence coupling agents of this kind have long been used, for example, in the production of glass fibre-reinforced plastics in order to improve the adhesion between glass fibres and the matrix resin. Silane-containing coupling agents are also employed in connection with self-adhesive compositions. An overview is given by the paper by U. Deschler et al. in Angew. Chem. 98 (1986) 237–253.

In JP 04173885 "Undercoat compsn. for adhesive sheet—obtd. by mixing silane coupling agent compsn. with isobutylene polymer", a silane-containing coupling agent is admixed to the adhesive composition. This leads to an increased bond strength, which counters ease of rerelease.

JP 62282924 "Labelling glass with tacky adhesive film—involves applying silane coupling agent to surface to improve bonding" describes a silane-containing coupling agent which improves the bond strength of self-adhesive tapes to glass or ceramic. It is applied directly to the substrate, and reacts with this substrate and with the adhesive composition of the self-adhesive film to form chemical bonds. This results not only in an improved water resistance of the adhesive bond but also to an increased bond strength, which is also manifested, however, in an increase in the difficulty of releasing the adhesive assembly.

Furthermore, JP 08165458 "Application of pressure sensitive adhesive film—includes precoating inorganic substrate with silane coupling agent for excellent adhesion and water resistance" describes a silane-containing coupling agent which through application to inorganic surfaces offers better adhesion to self-adhesive films. The behaviour of the adhesive assembly is comparable with that of JP 62282924.

For the systems described in the abovementioned documents, therefore, owing to the chemical attachment of the coupling agent to the pressure-sensitive adhesive composition and to the adherend surface, the use of an appropriate coupling agent leads to a sharp rise in the bond strength of the adhesive assembly and therefore hampers the release of the adhesive assembly. Residueless and nondestructive rerelease of the resulting adhesive bonds is thereby made more difficult if not impossible.

Faced with this problem, the object of the invention was to provide a solution which on the one hand ensures outstanding adhesion of the adhesive films in the dry and in the humid or wet state to surfaces of glass and ceramic, for example, but on the other hand, simultaneously, does not entail any deterioration in the ready and residueless releasability, i.e. separation of the adhesive film by stretching.

This object is achieved through the use of a silane-containing coupling agent as described in more detail in the claims, which reacts conventionally with glass and ceramic surfaces but which undergoes essentially no chemical reaction with the adhesive films employed.

Resulting adhesive assemblies surprisingly feature an outstanding bond strength in a dry environment, and also in a humid and wet environment as well, without deterioration in the release properties of the adhesive films, i.e. without increasing the release forces.

DETAILED DESCRIPTION

Formulation

As coupling agents, there are various functionalized silanes of the general formula $X-(CH_2)_n-Si(OR)_3$ that are obtainable commercially and are suitable in accordance with the invention.

Among these, those customary in particular are trimethoxysilanes of the general formula $X-(CH_2)_n-Si(OCH_3)_3$ and triethoxysilanes of the general formula $X-(CH_2)_n-Si(OCH_2-CH_3)_3$. Generally here, the methoxy compounds are said to be much more toxic than comparable ethoxy compounds. As a result, the triethoxysilanes are preferred.

The carbon chain $-(CH_2)_n-$ of these organosilanes $X-(CH_2)_n-Si(OR)_3$ can vary in length; customary values for n are 0, 1, 2, 3. The compounds where n=0, accordingly, are of the formula $X-Si(OR)_3$ and have a relatively low molar mass, leading to very high volatility. Like compounds where n=1, these compounds are thus more volatile than comparable compounds where n=2 or n=3. The use of n=2 leads to compounds such as, for example, the commercially available beta-(3,4-ethoxycyclohexyl)ethyltriethoxysilane. With n=3, compounds of the general formula $X-(CH_2)_3-Si(OR)_3$ are obtained, such as the commercially obtainable organosilanes: gamma-mercaptopropyltriethoxysilane of the formula $HS-(CH_2)_n-Si(O-CH_2-CH_3)_3$ and gamma-aminopropyltriethoxysilane with the formula $NH_2-(CH_2)_n-Si(O-CH_2-CH_3)_3$. The latter is prepared on an industrial scale and has a very low volatility.

The Si-containing moiety of the coupling agent binds to the inorganic surface, while the reactive residue X binds to the adhesive composition. Consequently, this radical X should advantageously be matched to the adhesive composition. Organosilanes with various radicals X are available commercially. When $X=CH_2=CH-$ the result is vinyl compounds, such as gammaglycidyloxypropyltrimethoxysilane, for example. Radicals $X=-CN$ and $X=$halide are also employed; for instance, 3-chloropropyltrialkoxysilane is used as a coupling agent in glass-fibre-reinforced plastics. However, in most cases organosilanes with cyanide and halide groups lead to severe skin and mucosal irritation. Also known are organosilanes having an amino radical ($X=NH_2$). Here, mention may be made in particular of the two commercially available compounds gamma-aminopropyltrimethoxysilane $NH_2-(CH_2)_3-Si(OCH_3)_3$ and gamma-aminopropyltriethoxysilane $NH_2-(CH_2)_3-Si(OC_2H_5)_3$. As tests have shown, these amino functionalized organosilanes are very good coupling agents between an inorganic surface and an adhesive composition based on synthetic rubber, such as the tesa Power-Strips, for example.

In summary, it can be stated that the organo-silane gamma-aminopropyltriethoxysilane, $NH_2-(CH_2)_3-Si-(OC_2H_5)_3$, is outstandingly suitable as a coupling agent between an inorganic surface, such as a tile or else glass, and an adhesive film such as the tesa Power-Strip. Accordingly, a new coupling agent has been found for the bonding of adhesive films such as tesa Power-Strips to inorganic substrates.

It does not appear sensible to use this coupling agent in its pure form. On the one hand, only a thin film of this coupling agent is required between adherend and adhesive film; on the other hand, the hazard potential and the sensitivity to hydrolysis are that much higher in its concentrated form.

Consequently, the organosilane is introduced into a solvent or solvent mixture. The concentration of the organosilane therein should be between about 0.1 and about 3% by weight. The solvent mixture consists preferably of 70–95% by weight of a hydrophobic component, such as toluene or ethyl acetate, and 30–5% of a hydrophilic component, such as ethanol or propanol, for example. In this context, ethyl acetate appears more suitable owing to the toxic effect of the toluene; in addition, isopropanol is preferred over ethanol. It should also be noted that this mixture, when wiped off, simultaneously cleans and degreases the adherend.

Preference is therefore given in particular to a formulation of 88% ethyl acetate, 11.5% isopropanol and 0.5% gamma-aminopropyltriethoxysilane. This organosilane, for example, is obtainable commercially under the trade name SILQUEST$^R$A1102 from OSI, Belgium.

The coupling agent is particularly suitable for adhesive compositions based on synthetic rubber as described in DEP 3331016, 4222849, 4339604 and 19626870, but also for adhesive compositions based on natural rubber, as set out in U.S. Pat. No. 4,024,312, and for those based on butyl rubber, polyisobutylene and α-olefin copolymers, and also mixtures of these compounds.

Presentation Form

For the consumer, the presentation form is of critical importance. In addition to packing in bottles and cans, preference is given to presentation in sealed-edge pouches.

Such a sealed-edge pouch consists of a solvent- and water-impermeable film, since neither the solvent mixture should escape nor water be able to penetrate, which would lead to the hydrolysis of the organosilane. This is ensured, for example, by the use of a PE/Al/PTPE film. Within the sealed-edge pouch there is a polymer nonwoven impregnated with the formulation of the invention. The 6×10 cm sealed-edge pouch is opened by pulling apart the two film sides, so that the user has no skin contact with the nonwoven that is impregnated with the formulation.

In order to bring about a marked improvement in the storage stability of the formulation it is necessary to prevent premature hydrolysis. The coupling agent formulation is therefore dried with molecular sieve. In this case, 5% by weight molecular sieve is applied to the entire quantity of liquid. Preferably, the solvent mixture is dried first and then the organosilane is added. A molecular sieve which has been employed is the drying agent Wessalith MS 330, which is obtainable from Degussa. The particle size of this molecular sieve is preferably 0.5–0.9 mm. In addition, some molecular sieve is introduced into the sealed-edge pouch.

Result

The use of this coupling agent formulation leads to a marked improvement in the adhesion, especially in the wet region. It is notable that through the use of this coupling agent formulation no difficulty is imposed on the release of the adhesive bond by stretching; the release of an adhesive film by pulling it in the direction of the bond area from an adherend surface which has been treated with this formulation requires the same force as the release of the adhesive film from a surface which has not been treated with coupling agent, or from a surface which has been treated only with solvent.

Test methods

Tip-shear Strength:

To determine the tip-shear strength, the surface is treated with the primer, and a defined time is allowed to elapse. Then a standard tesa Power-Strip measuring 20 mm * 50 mm, which is provided at one end on both sides with a non-adhesive tab region, is bonded to this surface, and a defined time is allowed to elapse.

The open face of adhesive is then bonded to a polystyrene baseplate. Atop this baseplate there is placed a steel hook having a 10 cm long steel pin, which sits vertically on the surface of the plate.

After the chosen tip-shear stress has been imposed by suspending a weight (the lever arm and mass of the weight are selectable), a measurement is made of the time taken for the bond to fail.

Removal Force (stripping force):

To determine the removal properties, a tesa Power-Strip is bonded to a tile and then stored at 40° C. for 16 h in a climate-controlled chamber.

With a pulling speed of 1000 mm/min, the adhesive film strip is peeled off parallel to the bond plane. In the course of its removal, the removal force (stripping force) required is measured, in N/cm, and the tile is examined for residues of adhesive composition.

EXAMPLE 1

A mixture was prepared in accordance with the composition described above, comprising the organosilane gamma-aminopropyltriethoxysilane (0.5% by weight) and the solvents isopropanol (11.5% by weight) and ethyl acetate (88.0% by weight). To prevent hydrolysis, 5% by weight of the molecular sieve WESSALITH MS 300 from Degussa, as described above, is added to the overall quantity of liquid. This mixture was stored airtightly in a bottle.

The three chosen test substrates were smooth tiles, rough tiles (manufacturer of both types of tile: Villeroy & Boch) and glass. These are treated with the coupling agent formulation by wiping them thoroughly 3 times with the impregnated cloth. This procedure lasts approximately 0.5–1 minute.

Subsequently, a time $t_0$ is allowed to elapse before one tesa Power-Strip is applied to the surface that has been treated with coupling agent. Directly thereafter, the baseplate is applied and the hook is placed atop it. The unweighted assembly is then placed in the climate-controlled cabinet at 40° C. and 100% relative humidity. After a time $t_1$, the hook, with a 9 cm lever arm, is subjected to 10 N and 20 N, respectively. The holding time is determined as a function of the waiting times $t_0$ and $t_1$. In addition, the nature of the fracture is examined; at the end, if possible, the strip is stripped off. Comparison was carried out using a substrate treated not with the coupling agent formulation but only with the solvent mixture.

A tesa Power-Strip bonded to an unprimed test substrate falls off within a few hours under the chosen experimental conditions; the results range between 0 and a maximum of 5 hours.

The substrates pretreated with the coupling agent formulation, on the other hand, showed markedly higher holding times. With a sufficient waiting time, the adhesive bonds held for a number of weeks. An overview of the results is shown by the following table.

TABLE

Holding power as a function of the application times $t_0$ and $t_1$.

| | Holding time [min] on unprimed substrate, weight 10N, lever arm 90 mm | Holding time [min] on primed substrate, weight 10N, lever arm 90 mm | Holding time [min] on unprimed substrate, weight 20N, lever arm 90 mm | Holding time [min] on primed substrate, weight 20N, lever arm 90 mm |
|---|---|---|---|---|
| smooth tile | | | | |
| $t_0 = 0$ min; $t_1 = 0$ min | <60 | 2880 | <10 | 65 |
| $t_0 = 0$ min; $t_1 = 2$ min | | 7200 | | 180 |
| $t_0 = 0$ min; $t_1 = 5$ min | | >10,000 | | 1100 |
| $t_0 = 0$ min; $t_1 = 10$ min | <60 | >10,000 | <30 | >3000 |
| $t_0 = 2$ min; $t_1 = 0$ min | <60 | 540 | <60 | 120 |
| $t_0 = 2$ min; $t_1 = 5$ min | | >10,000 | | >3000 |
| $t_0 = 2$ min; $t_1 = 10$ min | <300 | >10,000 | <240 | >3000 |
| $t_0 = 10$ min; $t_1 = 0$ min | <60 | >10,000 | <60 | >3000 |
| $t_0 = 10$ min; $t_1 = 10$ min | <300 | >10,000 | <300 | >3000 |
| rough tile | | | | |
| $t_0 = 0$ min; $t_1 = 0$ min | <60 | 2400 | <30 | >30 |
| $t_0 = 0$ min; $t_1 = 10$ min | <60 | >10,000 | <30 | >3000 |
| $t_0 = 10$ min; $t_1 = 0$ min | <120 | >10,000 | <30 | >3000 |
| $t_0 = 10$ min; $t_1 = 10$ min | <300 | >10,000 | <240 | >3000 |

TABLE-continued

Holding power as a function of the application times $t_0$ and $t_1$.

| | Holding time [min] on unprimed substrate, weight 10N, lever arm 90 mm | Holding time [min] on primed substrate, weight 10N, lever arm 90 mm | Holding time [min] on unprimed substrate, weight 20N, lever arm 90 mm | Holding time [min] on primed substrate, weight 20N, lever arm 90 mm |
|---|---|---|---|---|
| glass | | | | |
| $t_0 = 0$ min; $t_1 = 0$ min | <60 | >5000 | <60 | >60 |
| $t_0 = 0$ min; $t_1 = 10$ min | <120 | >10,000 | <60 | >3000 |
| $t_0 = 10$ min; $t_1 = 0$ min | <120 | >10,000 | <60 | >3000 |
| $t_0 = 10$ min; $t_1 = 10$ min | <300 | >10,000 | <60 | >3000 |

As the laboratory experiments show, the use of the coupling agent formulation leads to a greatly improved bond strength. The waiting time $t_1$, (time from bonding the strip to the tile until weighting of the adhesive bond) should advantageously be at least 5 minutes, although even without a waiting time ($t_1=0$) improved values are obtained.

All strips were released from the base plate and still adhered to the tile; consequently, the weak point is clearly the bond between tesa Power-Strips and baseplate. The application time $t_1$, is therefore required in order that the tesa Power-Strip can flow on the baseplate.

All Power-Strips were readily strippable from the tile. No residues of composition on the tile were observed. Also measured was the stripping force required to strip a Power-Strip from the tile. In the case of a tile cleaned only with water this force was 6.5(2) N/cm, for a tile treated with solvent mixture it was 6.4(2) N/cm and for a tile treated with the coupling agent formulation it was 6.6(1) and 6.2(3) N/cm. Consequently, when the coupling agent is used the stripping force, relative to a tile treated only with water or solvent mixture, is virtually the same, but the holding force, especially on exposure to water, is greatly increased: greater holding power especially on exposure to water but the same force during release.

EXAMPLE 2

The coupling agent formulation prepared in Example 1 was packaged in sealed-edge pouches as described above. These pouches consist of a welded aluminium pouch with a bonded-in nonwoven and a few grains of molecular sieve. Into each pouch there were introduced 0.58 g of coupling agent liquid, and 0.5 g of molecular sieve to prevent rapid hydrolysis of the organosilane.

A number of tiles were wiped with the coupling agent cloth, and the holding time of an adhesive bond with the tesa Power-Strip was determined as in Example 1. The results are very similar to those in Example 1.

We claim:

1. A method of adhering an adhesive film strip to a substrate in such a way that said adhesive film strip can later be removed from said substrate without leaving an adhesive residue on said substrate and without damaging said substrate, said method comprising:
   a) providing said adhesive film strip, which comprises an adhesive composition based on polymers or copolymers of synthetic rubber or natural rubber, and which adhesive film strip, when bonded to said substrate, can be released from said substrate by pulling on said adhesive film strip in the direction of the plane of the bond formed between said adhesive film strip and said substrate;
   b) providing a cloth impregnated with a moisture-reactive organosilane, said organosilane being dissolved in a solvent or solvent mixture, the organosilane being dissolved in said solvent or solvent mixture in a concentration of 0.1–3% by weight based on the combined weight of the organosilane and solvent or solvent mixture;
   c) rubbing an area of the substrate with the cloth to provide a treated area of said substrate;
   d) adhering the adhesive film strip to said treated area of substrate; and
   e) releasing said adhesive film strip from said treated area of substrate without leaving an adhesive residue on said substrate and without damaging said substrate by pulling on said adhesive film strip in the direction of the plane of the bond formed between said adhesive film strip and said substrate.

2. The method according to claim 1, wherein the adhesive film strip in d) is adhered on one side to an article or hook, or after d) an article or hook is adhered to a side of the adhesive film strip which is not adhered to the treated area of the substrate.

3. The method according to claim 1, wherein the organosilane is stored in a sealed pack.

4. The method according to claim 3, wherein the sealed pack contains the organosilane in the presence of a molecular sieve and in the absence of atmospheric humidity.

5. The method according to claim 3, wherein the pack is a sealed closure pouch with tear-open tabs, and the sealed closure pouch is opened shortly before the organosilane is used to impregnate said cloth by pulling apart the tear-open tabs.

6. The method according to claim 5, wherein the sealed closure pouch with tear-open tabs contains the organosilane in the presence of a molecular sieve and in the absence of atmospheric humidity.

7. The method according to claim 1, wherein the adhesive film strip comprises an extensible backing, a foamed backing or an extensible foamed backing, each of which is coated on both sides with an adhesive composition, or the adhesive film strip consists entirely of an adhesive composition which exhibits an adhesion that is lower than the cohesion thereof, the adhesion largely disappearing when the adhesive film strip is extended, and the adhesive film strip exhibits a ratio of stripping to tearing load of at least 1:1.5.

8. The method according to claim 1, wherein the organosilane is an alkoxysilane.

9. The method according to claim 8, wherein the alkoxysilane is ethoxysilane.

10. The method according to claim 1, wherein the organosilane is triethoxysilane.

11. The method according to claim 10, wherein the triethoxysilane is gamma-aminopropyltriethoxysilane.

12. The method according to claim 1, wherein the solvent is selected from the group consisting of alcohols, esters and mixtures of alcohols and esters.

13. The method according to claim 12, wherein the solvent is a mixture of ethyl acetate and isopropanol.

14. The method according to claim 1, wherein the cloth is a polymer nonwoven.

* * * * *